United States Patent
Cormier et al.

(10) Patent No.: US 9,249,853 B2
(45) Date of Patent: Feb. 2, 2016

(54) ENERGY ABSORBER WITH ANTI-BSR COUNTERMEASURE

(71) Applicant: OAKWOOD ENERGY MANAGEMENT, INC., Dearborn, MI (US)

(72) Inventors: Joel Matthew Cormier, Lathrup Village, MI (US); Michael Anthony Rossi, Grosse Ile, MI (US); Donald Scott Smith, Commerce, MI (US); Richard Francois Audi, Dearborn, MI (US)

(73) Assignee: Oakwood Energy Management, Inc., Dearborn, MI (US)

( * ) Notice: Subject to any disclaimer, the term of this patent is extended or adjusted under 35 U.S.C. 154(b) by 0 days.

(21) Appl. No.: 14/257,408

(22) Filed: Apr. 21, 2014

(65) Prior Publication Data

US 2015/0300439 A1 Oct. 22, 2015

(51) Int. Cl.
  *F16F 1/376* (2006.01)
  *F16F 7/12* (2006.01)
  *B60R 13/08* (2006.01)

(52) U.S. Cl.
  CPC ............ *F16F 7/123* (2013.01); *B60R 13/0815* (2013.01); *F16F 1/376* (2013.01)

(58) Field of Classification Search
  CPC ........... F16F 7/123; F16F 7/121; F16F 1/376; F16F 1/3737; B60R 13/0815; B60R 13/02; B60R 13/0212
  See application file for complete search history.

(56) References Cited

U.S. PATENT DOCUMENTS

| | | |
|---|---|---|
| 6,017,084 A | 1/2000 | Carroll, III et al. |
| 6,199,942 B1 | 3/2001 | Carroll, III et al. |
| 6,221,292 B1 | 4/2001 | Carroll, III |
| 6,247,745 B1 | 6/2001 | Carroll, III et al. |
| 6,679,967 B1 | 1/2004 | Carroll, III et al. |
| 6,682,128 B2 | 1/2004 | Carroll, III et al. |
| 6,752,450 B2 | 6/2004 | Carroll, III et al. |
| 7,360,822 B2 | 4/2008 | Carroll, III et al. |
| 7,377,577 B2 | 5/2008 | Carroll et al. |
| 7,384,095 B2 | 6/2008 | Cormier et al. |
| 7,404,593 B2 | 7/2008 | Cormier et al. |
| 8,465,087 B2 | 6/2013 | Gerwolls et al. |
| 2007/0187961 A1* | 8/2007 | Audi et al. ............. 293/134 |
| 2010/0244469 A1* | 9/2010 | Gerwolls et al. ........ 293/120 |

FOREIGN PATENT DOCUMENTS

WO   WO 9716655 A2 *   5/1997

* cited by examiner

*Primary Examiner* — Anna Momper
(74) *Attorney, Agent, or Firm* — Brooks Kushman P.C.

(57) ABSTRACT

An energy absorber includes a base sheet and a plurality of energy absorbing units with domed countermeasures extending from the base sheet. The countermeasures have slits in a domed portion thereof. The side walls of the energy absorbing units protect an adjacent object by cushioning the blow following repeated impacts in both vehicular and non-vehicular (e.g. helmets) environments. Preferably the side walls are oriented to buckle or bend after absorbing energy when impacted. The countermeasures primarily deaden any associated buzzes, squeaks or rattles. The integrally-formed countermeasures have a lower standing strength than the energy absorbing units. Methods related to the above are also described.

19 Claims, 4 Drawing Sheets

ENERGY ABSORBER WITH ANTI-BSR COUNTERMEASURE

This application relates to U.S. Pat. No. 8,465,087, filed Mar. 23, 2010 and issued Jun. 18, 2013, which claims benefit under 35 U.S.C. §119(e) from provisional application Ser. No. 61/164,700, filed Mar. 30, 2009, entitled ENERGY ABSORBER WITH ANTI-SQUEAK ANTI-RATTLE FEATURE, the entire contents of which applications are incorporated herein by reference.

BACKGROUND (1) Technical Field

The present invention relates to recoverable energy absorbers, such as are used non-destructively and re-usably for absorbing energy in automotive and non-automotive applications.

(2) Background Art

Vehicle manufacturers spend considerable time and effort to eliminate BSR noises because they can be very irritating and annoying to vehicle drivers and passengers, particularly when the BSR noises come from a location close to a passenger's head, and/or any component in the vehicle's passenger compartment, especially when the noises are created near or are amplified by components that effectively form an echo chamber.

Many different geometrically shaped thermoformed energy absorbers are known, such as those described in U.S. Pat. Nos. 6,017,084; 6,221,292; 6,199,942; 6,247,745; 6,679,967; 6,682,128; 6,752,450; 7,360,822; 7,377,577; 7,384,095; and 7,404,593. These absorbers are said to provide dynamic reaction force characteristics that produce a relatively "square wave" shape when observing their reaction force properties as a function of deflection.

U.S. Pat. No. 8,465,087 describes a formed energy absorber with an integrated anti-squeak/anti-rattle feature which includes a protrusion ("countermeasure") that suppresses or dampens buzzes, squeaks or rattles at the end wall of an energy absorbing structure. Such structures typically lie between a Class-A surface (such as a bumper fascia, a headliner, or a door trim panel) and a rigid sheet metal structure in automotive applications. The absorber is typically installed with a 3-5 mm gap from one surface and is attached to another. However, in some instances it becomes necessary to reduce the gap to improve the reaction response time at the primary area of impact prior to secondary impacts as for example the head rolls into adjacent structures. When the absorber contacts the opposing surface, an undesirable buzz or rattle can be heard. This noise occurs because a flat hard plastic surface can tap or vibrate against the opposing structure. The '087 patent describes an anti-buzz, squeak or rattle feature that is formed integrally with energy absorbers during the thermoforming process. However, this feature has proven difficult to form consistently, requires relatively a narrow processing window, and generally lacks the flexibility necessary to fully mitigate the translation of one structure to another that creates a BSR condition.

Materials such as foam, felt, and flock are often added to absorbers which lack an integrated structure to remedy the issue. A fabric pad, flock material, foam padding, or some other kind of flexible material if added to one of the surfaces responsible for making the noise may lessen or eliminate the severity of the buzzing or tapping or eliminate the possibility of one surface translating into the other. However, this solution requires the purchase and assembly of one or more separate components, and that results in added complexity, cost, and mass.

SUMMARY OF INVENTION

One aspect of the present invention includes a base sheet and a plurality of energy absorbing units extending from the base sheet. Each energy absorbing unit includes a side wall that even when subjected to multiple hits deflects while absorbing energy and at least partially recovers after each hit. The energy absorbing unit includes an end wall. At least one of the base sheet and the end wall of at least one energy absorbing unit includes a number (X) of integrally-formed protruding countermeasures ("ears") where $1<=X<1000$. The protruding countermeasures have a lower standing strength than the energy absorbing units so that the protruding countermeasures dampen movement that may otherwise cause buzzes, squeaks and/or rattles ("BSR") between the base sheet or end wall and an adjacent structure.

One aspect of the present disclosure includes a modified end wall structure that is superior to prior structures relative to ease of manufacture, cost, and function.

The improved energy absorber is created through a combination of designed geometry and tooling that creates a "domed" flexible member ("countermeasure") extending from the end wall of an energy absorbing unit. The dome is designed and engineered in such a way that it interacts with the reaction surface through a touch or designed interference condition. In one embodiment, the frusto-conical side wall of the energy absorbing unit is maintained, but some or all of the end wall is convex or "domed". In response to impact the side wall may buckle without reversion to its un-deflected state, but the countermeasure may revert to its initial condition soon after impact. This provides a rapid response to the desire to suppress buzzes, squeaks or rattles ("BSR") after the hit.

In one embodiment, the domed countermeasure protrudes from the inner radius of an annular perimeter of the flat end wall. In another embodiment, the dome rises from the top of the side wall. In either embodiment there is tangential point contact between the energy absorbing structures and the adjacent structures that minimizes the surface area in contact with the reaction surface.

When the energy absorber is manufactured from a material of thickness (T), tooling is used to mold or coin the domed area to a thickness (t) substantially less than 0.5 (T), e.g., 0.1 (T). This makes the dome more flexible than the rest of the structure and isolates or localizes preferred flexibility at and around the dome.

Imagine the dome is represented by part of a hemispherical shell with a pole positioned at its highest point and lines of longitude extending radially therefrom. In one embodiment, the dome may be lanced or cut parallel to the lines of longitude to create flexible "petals" that enable additional flexibility when compared to a non-lanced dome of the same material thickness. By changing the shape and position of the cuts in the dome, in combination with the "coined" thickness of the dome, additionally flexibility or strength may be imparted to meet BSR performance objectives.

In another aspect of the invention, an energy absorber includes a base sheet and a plurality of frusto-conical energy absorbing units extending from the base sheet. Each energy absorbing unit has a side wall that is oriented so that upon receiving the forces of impact ("incident forces"), the side wall offers some resistance, deflects and partially reverts (springs back) to an un-deflected pre-impact configuration while exerting reaction forces to oppose the incident forces.

This phenomenon effectively cushions the blow by arresting the transmission of incident forces directed towards the mass or object to be protected (e.g., an anatomical member, a piece of sheet metal, an engine block, or the head of a passenger or player).

In another aspect of the present invention, a method includes the substantially simultaneous steps of forming an energy absorber with a base sheet and energy absorbing units extending from the base sheet with associated integral domed countermeasures of a weaker standing strength than the energy absorbing units.

In still another aspect of the present invention, an assembly method includes the steps of (1) providing a component or other mass to be protected, (2) forming substantially simultaneously an energy absorber including energy absorbing units and optionally at least one domed countermeasure in an end of one or more of the energy absorbing units, the countermeasure being configured to interface with the component or mass when placed adjacently, so that BSR from movement of the energy absorber relative to the adjacent component or mass is reduced or eliminated, and (3) assembling the energy absorber and the component or mass in adjacent positions.

In yet another aspect of the present invention, a thermoforming apparatus for making the energy absorber includes a heater for heating a flat sheet of a polymeric material, at least one thermoforming die for forming the flat sheet into a three-dimensional energy absorber that absorbs impacting forces non-destructively, the absorber having a base sheet and a plurality of energy absorbing units, and tooling for forming domed BSR countermeasures in at least one of the base sheet and the energy absorbing units.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
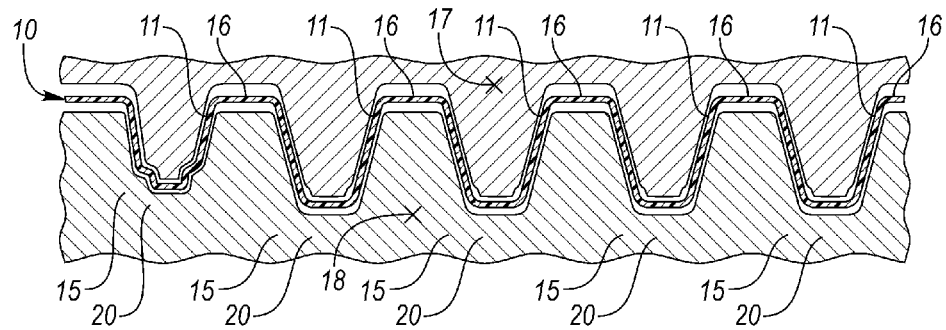
FIG. 1 is a cross-sectional view of opposing thermoforming dies for forming a sheet into an energy absorber with a plurality of energy absorbing units and domed countermeasures extending from recesses formed in the base sheet. At least some of the units have integral domed countermeasure for reducing buzzes, squeaks, and rattles ("BSR") upon installation.
Figure 2:
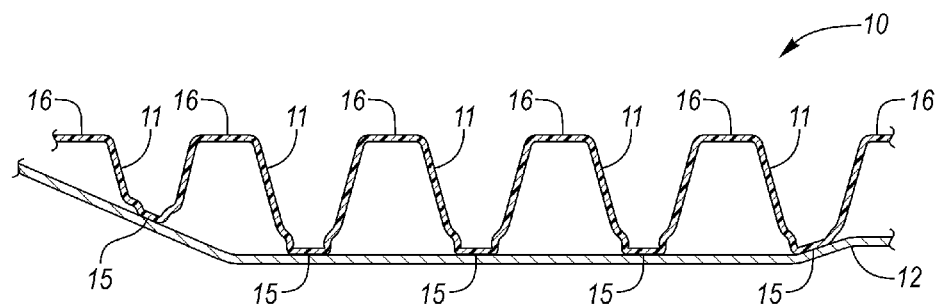
FIG. 2 is a cross-sectional view showing the thermoformed energy absorber of FIG. 1.
Figure 3:
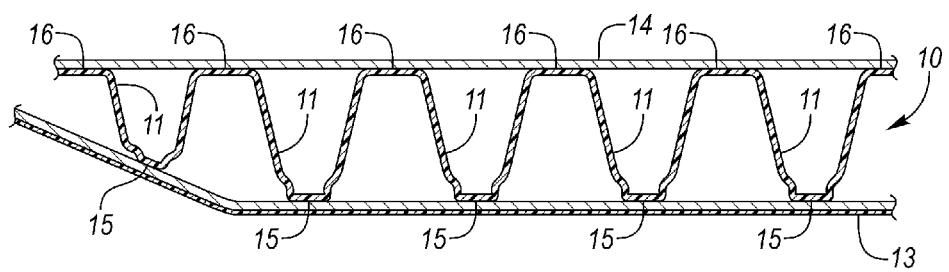
FIG. 3 is a cross-sectional view showing the energy absorber installed between for example a roof structure of a passenger vehicle and a headliner or a helmet and the head of a wearer.

FIG. 1 illustrates a thermo forming process step in which an energy absorber 10 is shaped between a male (upper) die and a female (lower) die. If desired the dies could be inverted. FIG. 2 shows the product so formed. FIG. 3 depicts the energy absorber interposed between for example a vehicle roof 14 and a headliner 13.

Figure 4:
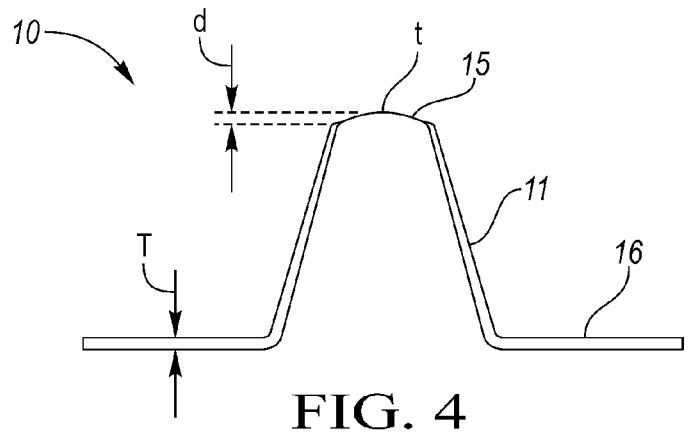
FIG. 4 is a cross section through one energy absorbing unit having a coined dome-shaped countermeasure extending from an end wall thereof.

FIG. 4 is a cross section through one energy absorber ("EA") 10 with a coined domed countermeasure 15 whose thickness (t) is substantially less than that of a base 16 or sidewalls 11. A relatively thin dome 15 promotes flexibility in the interfacial region between the energy absorber 10 and a surface with which it is juxtaposed.

As shown in FIGS. 5-9, if desired, the domed region 15 may be cut or lanced longitudinally and/or laterally to create slits 19 in a manner to be described to enhance flexibility and create pre-engineered zones of weakness.

In several embodiments of the invention the disclosed energy absorber has a base sheet 16 and a plurality of energy absorbing units 11 that preferably are reusable after exposure to multiple impacts. The energy absorbing units 11 extend from the base sheet 16. Each energy absorbing unit 11 has an end wall 12 and a side wall 13 that in some cases revert at least partially towards an un-deflected configuration after impact. The sidewall 13 absorbs energy after being impacted. The end wall 12 of at least one energy absorbing unit 11 includes a number (X) of integrally-formed domed countermeasures 15, where $1<=X<1000$.

In some cases, the energy absorbing unit 11 reverts to an un-deflected or compression set configuration after a first impact. As used herein the term "compression set" means a configuration before impact in which an energy absorbing unit lies after being squeezed or compressed into position between for instance a Class A surface (e.g. a bumper fascia) and a rigid block or sheet of metal (e.g. a bumper frame). In other cases, the energy absorbing unit may revert to or towards the compression-set configuration after multiple impacts.

To absorb impact forces, the side wall 13 of an energy absorbing unit 11 bends in response to impact like the wall of a concertina or bellows and springs back to an un-deflected configuration in further response to impacting forces. In some cases opposing side walls 13 of an energy absorbing unit bend at least partially convexly after impact. In other cases, opposing side walls of the energy absorbing unit bend at least partially concavely after impact. Sometimes, opposing side walls of the energy absorbing unit 11 bend at least partially concavely and convexly after impact.

In one embodiment, the energy absorber 10 has an energy absorbing unit 11 with an end wall 12 that includes an annular ring around the perimeter of the end wall 12 of the domed countermeasure 15. The domed end wall 12 is supported by an upper periphery of the side wall 13 and deflects inwardly, thereby absorbing a portion of the energy dissipated during impact.

Several alternative designs call for the countermeasure 15 to be formed in the base sheet 16. In others, the countermeasure 15 is formed in the end wall 12 of an energy absorbing unit 11.

Aided by these structures, the disclosed energy absorber can be re-used after single or multiple impacts. For example the hockey or football player or cyclist need not change his helmet after every blow. Most of the recovery occurs quite soon after impact. The remainder of the recovery occurs relatively late in the time period of recovery.

In a given end wall 12 there is a number (X) of countermeasures 15, where $1<=X<1000$. Some or all countermeasures 15 have slits 19 originating at an imaginary pole of a generally hemispherically shaped domed countermeasure. As used herein the term "hemispherical" is not limited in a geometrical sense to half of a sphere. It may describe or qualify a spheroid or oblate spheroid for example, like a squashed orange or pear or a section of a football.

As to the shape of the energy absorbing units 11, it is useful to define an annular perimeter 17 (FIGS. 7-9) of the end wall 12 inside the side wall 13. The annular perimeter 17 has an inner radius (r) from which the domed countermeasure rises. Alternatively, the domed countermeasure may rise from a collar 21 extending from the end wall.

It is contemplated that the "soft" BSR countermeasure 15 can be formed integrally with the material of an energy absorbing unit at or near the location(s) of potential buzz, squeak, or rattle BSR noises.

Where deployed, the BSR countermeasure 15 has a relatively lower longitudinal/standing strength than the associated energy absorbing unit 11. Though the sidewall of an energy absorbing unit may buckle and assume a permanent deformation following impact, the countermeasure flexes and reverts to its pre-impact configuration. Accordingly, it acts as a dampener, thus greatly reducing the likelihood of significant BSR noises in the final assembled product (such as an automotive vehicle or crash helmet for a motor cyclist or a helmet for the skier, hockey player or football player). Further, a significant assembly cost reduction and mass reduction can be realized with only a minimal or zero increase in the tooling and/or manufacturing cost because various wadding or muffling materials are no longer needed.

Various headliner constructions are exemplified in the drawings. However, persons skilled in this art will understand that the present disclosure is not limited to headliners, but instead can be applied to many other applications, including but not limited to other locations in a vehicle (e.g., doors, instrument panels, trim components for A, B and C pillars and roof supporting structures of vehicles, and other components), various types of protective headgear, and other protective gear that intercedes between an anatomical member (e.g., a knee, elbow, stomach) and an impacting object.

Figure 5:
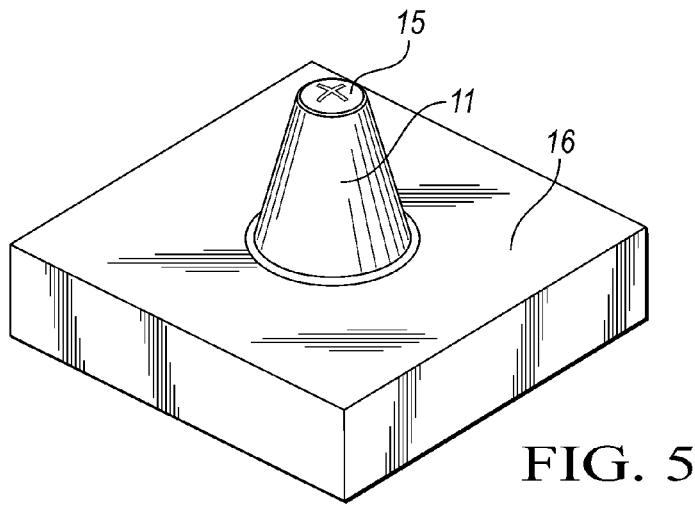
FIGS. 5-6 are isometric views of a single energy absorbing unit.
Figure 6:
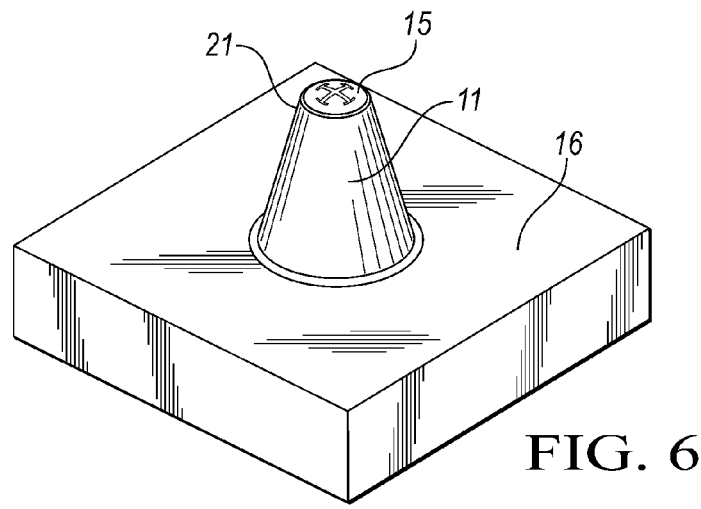
Figure 7:
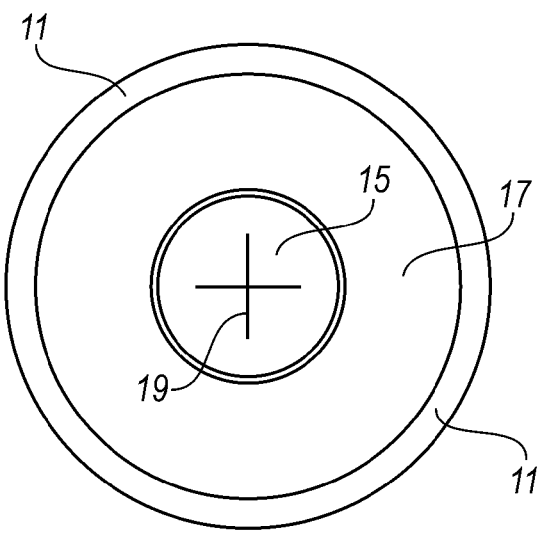
FIGS. 7-8 are top views of the units depicted in FIGS. 5-6.
Figure 8:
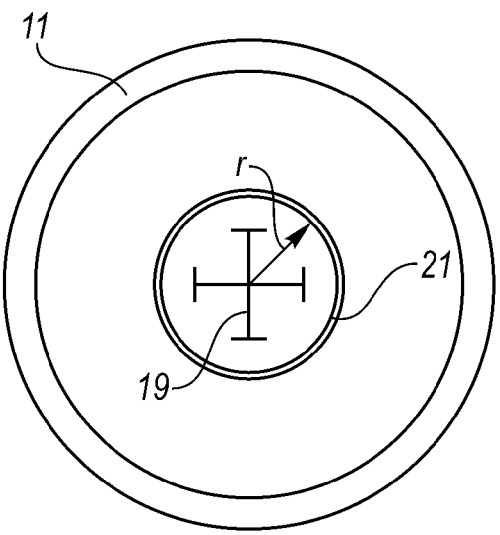
Figure 9:
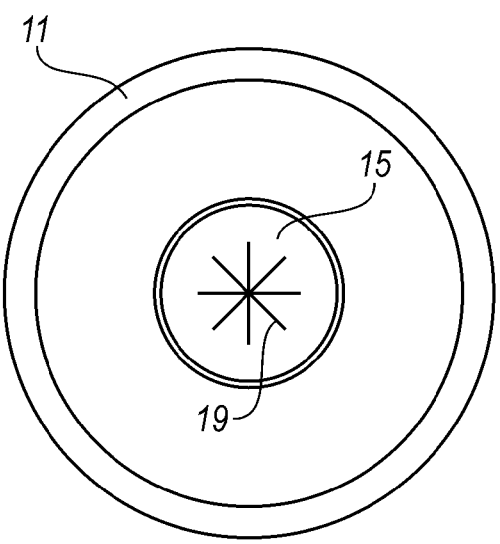
FIG. 9 is a top view of an alternate embodiment.

In one embodiment, an energy absorber 10 (illustrated in FIGS. 1-3) includes a matrix of hollow frusto-conical, distended frusto-conical (e.g. with an oval or elliptical footprint/ lower perimeter/upper perimeter or cross section), cup-shaped (with a wall that is curvilinear—e.g., bowed, convex or concave when viewed from the side—or flat), domed, hemispherical or flat-sided pyramid-shaped) three-dimensional energy absorbing units with side walls 11 extending from a base sheet 16. At least some of the energy absorbing units 11 have the BSR countermeasure 15 that extends from an end wall 12 of an energy absorbing unit 11. In some cases the countermeasure 15 may effectively be flattened somewhat so that it resembles a domed end wall 12 that extends between the sidewalls 13 of an energy absorbing unit 11 (FIGS. 5-6).

The energy absorbing units 11 can be arranged on the energy absorber 10 in any repeating or non-repeating, uniform or non-uniform pattern desired, such as an orthogonal or diagonal matrix of rows (parallel or converging) and columns (parallel or converging) that would partially or totally cover the mass to be protected, for example an area of a vehicle roof from the side-to-side and from the front-to-rear of a vehicle's passenger compartment.

Further, the energy absorbing units 11 can be similar to each other or can be varied, so as to have different or similar footprints, widths, heights, and/or cross-sectional shapes (parallel, inclined or perpendicular to the base sheet 16). The energy absorbing units 11 can have uniform or non-uniform spacing and/or different lateral relationships and/or be varied to accommodate the spatial constraints imposed by the environment of use, such as the vehicle roof and mating structures as needed for energy absorption in different areas of the assembly. For example, the energy absorber 10 can have different regions, some regions having energy absorbing units arranged or configured a first way, and other regions having energy absorbing units arranged or configured a second or different way. This is often the situation where energy absorbers are used in for example vehicle roof structures, as will be understood by persons skilled in this art. After thermoforming, the base sheet 16 may be flat or bent as desired.

As an example, the illustrated energy absorber 10 is thermoformed from a heated sheet 16 of a polyolefin polymeric material such as that available from Lyondell Bissell under the product name SV 152. The sheet is heated to a temperature below its melting point and positioned between by opposing forming dies 17, 18 (see FIG. 1), and then cooled to form a three-dimensional energy absorber (see FIG. 2). Opposing forming dies 17, 18 are illustrated, but it is contemplated that the present inventive concepts can be made using other forming processes, such as a thermoforming process using only a single sided die (e.g. by vacuum thermoforming). Optionally the absorber is made by softening a sheet of starting material and positioning it across a tool with which it is made to conform under a vacuum. It will be appreciated that the present inventive concepts can be made by other forming processes, such as injection molding, compression molding, and the like.

Once formed, the illustrated energy absorber 10 is adapted to fit between and generally at least partially bridge a gap between for instance a vehicle headliner 13 and its roof 14 (see FIG. 3). In the exemplary application depicted, the energy absorbing units 11 and the base sheet 16 are generally configured to occupy at least some space between the headliner 13 and roof 14. The outer ends 12 (also called "end walls" or "base" herein) of the energy absorbing units 11 and the base sheet 16 generally match the contoured mating surfaces on the headliner 13 and roof 14.

The illustrated energy absorber 10 has differently shaped energy absorbing units 11 that are configured to meet spatial or aesthetic requirements and cover protruding bolts plus other fittings while optimizing the safe absorption of energy and distribution of impact loads in order to reduce at least in vehicular applications passenger head injury (such as during a vehicle crash or roll-over accident) or in other non-vehicular applications (such as head- or limb-protecting gear).

As noted above, the (BSR) countermeasure 15 (also called an "ear" or "soft structure" herein) is integrally formed into its end wall 12, as illustrated. An energy absorber 10 may have energy absorbing units 11 with a collective number (X) of ears 15 that are associated with the energy absorber 10, where $1<=X<1000$.

The countermeasures 15 have a lower standing strength than the energy absorbing units 11. Their "softness" reduces the potential for BSR noises caused by repeated noise-generating vibration and/or cyclical movement of the energy absorber 10 against adjacent rigid surfaces on for example the headliner 13 and roof 14.

In end wall 16, the illustrated BSR countermeasure 15 (FIG. 1) preferably is formed by a rounded male protrusion 20 that extends from the top die 17 into a mating recess in the lower die 18. The protrusions 20 include at least part of a hemispherical dome. As a consequence the sheet material assumes a shape after cooling that resembles a dome-shaped thin-walled hollow BSR countermeasure 15. It will be appreciated that the dome may be described by an angle of latitude (in terrestrial terms) less than 90 degrees, i.e., the dome need not be a geometrically perfect hemisphere.

In some cases the base sheet 16 (or roof, depending on orientation) of an energy absorbing unit 11 itself may be domed to form a countermeasure 15 so as effectively to interface with a neighboring structure, thereby reducing an area of contact therebetween and reducing or eliminating BSR.

The illustrated BSR countermeasures 15 are sufficient in length and strength to maintain their generally hemispherical shape after the starting sheet material is cooled (see FIG. 2). In particular, the height of the BSR countermeasures 15 in combination with energy absorbing units 11 is greater than any expected gap between the headliner 13 and the roof 14 (in vehicular applications), such that the BSR countermeasure 15 contacts the headliner 13 (or roof 14) and is compressed during assembly into the vehicle.

The domed BSR countermeasure 11 also compensates for variations in the gap size due to part tolerance variation, assembly stack-up variations, and other process and part variables that may lead to inconsistent gaps. This results in the BSR countermeasures 15 acting to dampen any cyclical or vibratory movement of the energy absorber 10, which in turn eliminates most BSR noises.

As an example, it is contemplated that the BSR countermeasures 15 can be about $\frac{1}{8}$ to $\frac{1}{2}$ inch in height (or more typically about $\frac{1}{4}$ to $\frac{3}{8}$ inches), and at their base about $\frac{1}{32}$ to $\frac{1}{4}$ inch in diameter (or more preferably about $\frac{1}{16}$ to $\frac{1}{8}$ inch in diameter).

Figure 10:
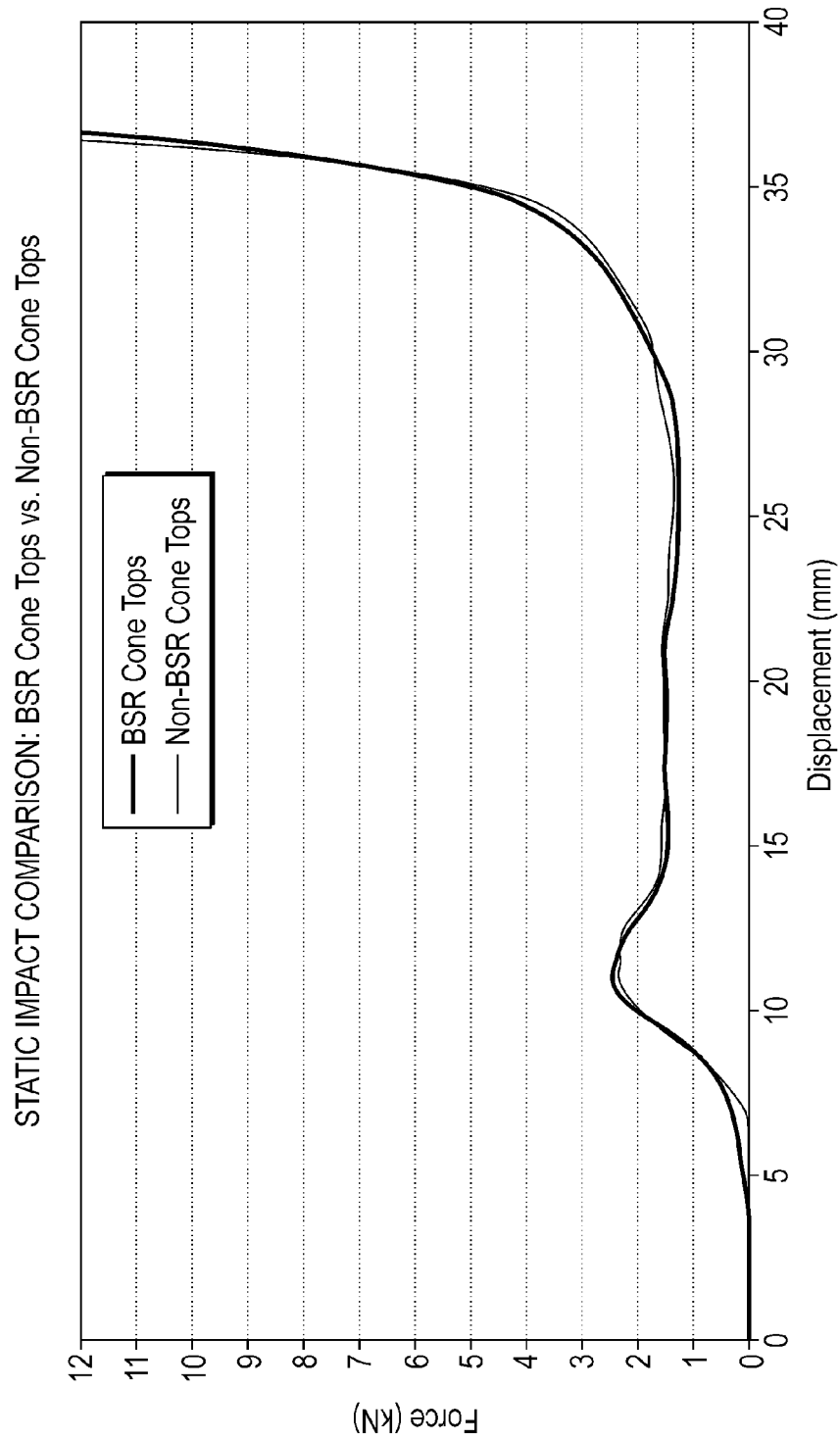
FIG. 10 is a force-displacement graph that illustrates the response of energy absorbing units with and without a countermeasure.

As mentioned earlier, the countermeasure is preferably sufficiently flexible so that it deflects at relatively low loads in a relatively elastic manner. The term "relatively low load" as used herein is defined as less than 2 lb.f at each point of contact. By comparison, the energy absorbing unit itself typically collapses at loads in excess of 10 lb.f (see, e.g. FIG. 10). In this way, flexibility is substantially localized at the countermeasure on the end wall.

One manufacturing technique involves coining. Though other methods may be suitable, coining is done by providing a rigid lower member (typically metal) and an upper coining member. A representative configuration is a matched metal set and a material which is more rigid than the molten plastic (like a rigid silicone rubber). This prompts displacement of material away from the domed countermeasure, preferentially thinning the dome in the contacted area. Other things being equal, the thinner the material, the less resistance is required to displace the dome. Furthermore, by relieving the dome with cross cuts as described above, the resistance required to displace the dome is further reduced.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An energy absorber comprising:
   a base sheet and
   a plurality of energy absorbing units extending from the base sheet, each energy absorbing unit including an end wall and a side wall that absorbs energy by deflecting in the form of bending or buckling after being impacted, and
   the end wall including a number (X) of integrally-formed domed countermeasures, where $1<=X<1000$, the domed countermeasures being more flexible than the base sheet or the sidewall and wherein at least some of the domed countermeasures include one or more slits formed in a polar portion of the associated countermeasure, the domed countermeasures reverting to or towards an undeflected state following impact, thereby suppressing buzzes, squeaks or rattles after impact.

2. The energy absorber defined in claim 1, wherein the countermeasure includes at least a part of a hemisphere characterized by imaginary lines of longitude that extend from a polar portion of the dome and imaginary lines of latitude that extend orthogonally thereto, the slits being longitudinal slits extending parallel to at least some of the lines of longitude.

3. The energy absorber defined in claim 2, further including one or more latitudinal slits that extend from at least some of the longitudinal slits.

4. The energy absorber as defined in claim 1, wherein the one or more slits extend radially from the polar portion thereof.

5. The energy absorber as defined in claim 4, wherein the one or more slits includes four longitudinal slits.

6. The energy absorber defined in claim 1, wherein the side wall bends in response to impact and springs back towards an un-deflected configuration in response to impacting forces.

7. The energy absorber defined in claim 1, wherein opposing side walls of an energy absorbing unit bend at least partially convexly after impact.

8. The energy absorber defined in claim 1, wherein opposing side walls of an energy absorbing unit bend at least partially concavely after impact.

9. The energy absorber defined in claim 1, wherein opposing side walls of an energy absorbing unit bend at least partially concavely and convexly after impact.

10. The energy absorber defined in claim 1, wherein the end wall includes an annular perimeter with an inner ring from which the domed countermeasure extends.

11. The energy absorber defined in claim 1, wherein the end wall is supported by an upper periphery of the side wall so that the domed countermeasure rises from the upper periphery.

12. The energy absorber defined in claim 1, wherein a countermeasure is formed in the base sheet.

13. The energy absorber defined in claim 10, wherein the countermeasure is formed from material flowed from the sidewall and annular perimeter of the end wall while the energy absorber material is formed.

14. An energy absorber comprising:
    a base sheet;
    a plurality of energy absorbing units extending from the base sheet, at least some of the energy absorbing units including
    a side wall that absorbs energy by partial deformation and deflection and reverting toward an un-deflected configuration after the associated energy absorbing unit is impacted; and
    an end wall including a number (X) of domed lanced countermeasures that include flexible petals, where $1<=X<1000$.

15. The energy absorber defined in claim 14, wherein the energy absorbing units have a shoulder at the intersection of the side wall and the base sheet.

16. The energy absorber defined in claim 15, wherein the shoulder is of a shape selected from the group consisting of a circle, an oval, an ellipse and a polygon.

17. The energy absorber as defined in claim 14, wherein one or more of the countermeasures have a wall thickness that is thinner than that of the base sheet and the sidewall.

18. A method of making an energy absorber, the method comprising the substantially simultaneous steps of:

forming an energy absorber from a base sheet with energy absorbing units and sidewalls extending from the base sheet; and forming a number (X) of lanced countermeasures associated with energy absorbing units, where 1<=X<1000, the countermeasures being weaker than the sidewalls, the countermeasures extending a distance (d) from the sidewalls of the associated energy absorbing units.

19. A method of orienting an energy absorber in relation to a mass to be protected by the energy absorber, the mass including an object or a part of the anatomy, the method comprising steps of:

providing a mass to be protected from impact;

forming an energy absorber including energy absorbing units with sidewalls that deflect in response to impact;

coining domed countermeasures having a tapering wall thickness and one or more slits defined therein, the countermeasures rising from an end wall of an energy absorbing unit; and assembling the energy absorber and the mass to be protected in adjacent positions so that the sidewalls and countermeasures of the energy absorbing units protect the mass after multiple impacts and the countermeasures deaden sound associated with juxtaposition of the mass and the energy absorber.

\* \* \* \* \*